(12) United States Patent
Wasilewski

(10) Patent No.: US 6,721,956 B2
(45) Date of Patent: Apr. 13, 2004

(54) INTERACTIVE INFORMATION SERVICES SYSTEM AND ASSOCIATED METHOD FOR CAPTURING TRANSACTION DATA

(75) Inventor: Anthony J. Wasilewski, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 272 days.

(21) Appl. No.: 09/907,414

(22) Filed: Jul. 17, 2001

(65) Prior Publication Data

US 2003/0018976 A1 Jan. 23, 2003

(51) Int. Cl.[7] .................. H04N 5/445; G06F 3/00; G06F 13/00
(52) U.S. Cl. ................ 725/60; 725/1; 725/86; 725/91; 725/103; 705/26; 705/50; 705/53; 705/75; 705/78
(58) Field of Search ............... 725/1, 86, 91, 725/98, 103, 104, 60; 705/50, 53, 75, 78, 26; 380/255, 256, 260

(56) References Cited

U.S. PATENT DOCUMENTS

| | | | |
|---|---|---|---|
| 4,799,156 A | | 1/1989 | Shavit et al. |
| 4,947,028 A | | 8/1990 | Gorog |
| 4,960,981 A | | 10/1990 | Benton et al. |
| 5,159,633 A | | 10/1992 | Nakamura |
| 5,191,410 A | | 3/1993 | McCalley et al. |
| 5,339,250 A | | 8/1994 | Durbin |
| 5,414,773 A | | 5/1995 | Handelman |
| 5,469,206 A | | 11/1995 | Strubbe et al. |
| 5,479,510 A | | 12/1995 | Olsen et al. |
| 5,539,450 A | | 7/1996 | Handelman |
| 5,592,212 A | | 1/1997 | Handelman |
| 5,594,789 A | | 1/1997 | Seaholtz et al. |
| 5,606,361 A | | 2/1997 | Davidsohn et al. |
| 5,790,677 A | * | 8/1998 | Fox et al. ............. 705/78 |
| 5,878,141 A | * | 3/1999 | Daly et al. ............ 705/78 |
| 5,963,915 A | * | 10/1999 | Kirsch ................ 705/26 |
| 2002/0001965 A1 | * | 2/2002 | Tomsen ............... 725/42 |
| 2002/0135805 A1 | * | 9/2002 | Fahraeus et al. ......... 358/1.15 |
| 2002/0194604 A1 | * | 12/2002 | Sanchez et al. .......... 725/60 |
| 2003/0023504 A1 | * | 1/2003 | Berenson et al. ......... 705/26 |

\* cited by examiner

Primary Examiner—Vivek Srivastava
Assistant Examiner—Ngoc Vu

(57) ABSTRACT

A method and system are provided to permit a network operator to capture transaction data relating to transactions between a subscriber and a service provider that are conducted via a communications network established by the network operator, such as a cable television network. In operation, the subscribers are provided with information relating to items offered by one or more service providers. The subscriber can transmit a purchase order. A headend of the communications network receives and analyzes the purchase order to capture transaction data. If the service provider is different than the network operator, the headend also relays a copy of the purchase order to the third party service provider such that the purchase order can be filled. Since the network operator has captured information relating to the purchase order, however, the network operator can charge the service provider and/or the subscriber for utilizing its network to facilitate the transaction.

41 Claims, 4 Drawing Sheets

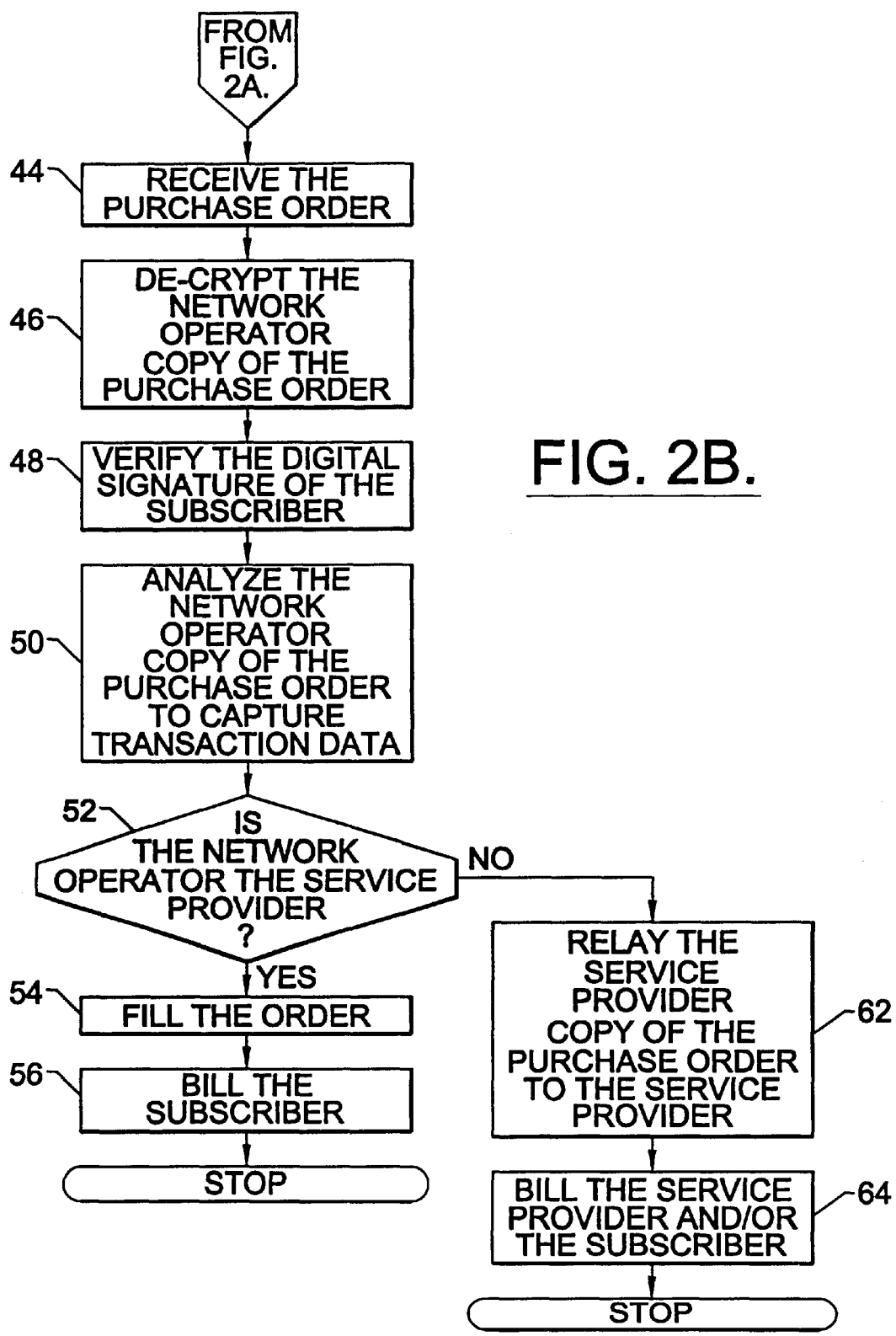

| |
|---|
| SUBSCRIBER ID |
| SERVICE PROVIDER ID |
| ITEM DESIGNATION |
| QUANTITY |
| OPTIONS |
| PRICE |
| PAYMENT INFORMATION |
| DELIVERY ADDRESS AND INSTRUCTIONS |
| |

FIG. 3.

INTERACTIVE INFORMATION SERVICES SYSTEM AND ASSOCIATED METHOD FOR CAPTURING TRANSACTION DATA

FIELD OF THE INVENTION

The present invention relates generally to methods and apparatus for capturing transaction data relating to transactions between a subscriber and a service provider conducted via an interactive information services system and, more particularly, to methods and apparatus for permitting the network operator of a cable television network to capture transaction data relating to transactions between a subscriber of the cable television network and a service provider, such as an Internet-based merchant.

BACKGROUND OF THE INVENTION

The variety of services provided via existing telephone lines and coaxial cable networks has been steadily increasing for some time. Recent technological advances, such as technological advances in the fields of data compression and data encryption as well as digital signature techniques for permitting the validation of messages, has significantly increased both the number of services provided via existing telephone lines and coaxial cable networks as well as the demand for such services by subscribers. In this regard, subscribers are becoming more accustomed to the provision of such services via existing telephone lines or existing coaxial cable networks, and also are becoming more comfortable with the security measures taken to ensure the confidentiality of the transmitted information.

For example, cable television network operators already provide addressed message transmissions, pay-per-view programming, impulse pay-per-view programming, favorite channel features, and parental control features. Cable television network operators can also provide text services such as news articles, sport scores, stock market quotations and weather reports. More recently, cable television network operators have proposed to provide additional features such as video game delivery, digital audio services, wide area network access, travel reservations services, home banking services, energy management services, video conferencing, burglary and fire alarm services, and home shopping services. As such, interactive information services systems have been developed that utilize existing telephone lines and coaxial cable networks to provide these additional services to the subscribers.

Interactive information services systems include one or more service providers, one or more subscribers who may purchase the items offered by the service providers, and a network operator for providing the communications network between the service providers and the subscribers. For example, operators of existing cable television networks increasingly serve as the network operator by providing a communications network over which the various services offered by the service providers are delivered to the subscribers. With respect to some of the services, the network operator is also the service provider. For example, a cable television network is a network operator, but may also be a service provider for the provision of pay-per-view programming and the like. In many instances, however, third party service providers, i.e., service providers other than the network operator, provide the various services delivered via the communications network established by the network operator. For example, third party service providers typically provide travel reservations services, home banking services, home shopping services and the like.

In order to offer an even broader array of services, interactive information services systems have linked existing communications networks, such as existing telephone networks or existing cable television networks, with the Internet. For example, Le Groupe Videotron and WebTV offer interactive information services systems that have linked a cable television network with the Internet.

One particularly popular Internet-based service is home shopping. While home shopping has been provided by cable television networks for some time, the variety of shopping possibilities offered by the Internet-based merchants are much more numerous and diverse. Cable television network providers are often reluctant to provide their subscribers with the extensive home shopping services offered by Internet-based merchants since these additional services would likely decrease viewership for cable television programming. In addition, in instances in which the network operator does not provide the service, the network operator will not be compensated for the transactions conducted via their network. As such, although the network operator may provide the communications network for numerous transactions that involve significant amounts of money in the aggregate, the network operator will generally not receive a share or percentage of the transactions' value.

In view of the importance of the telephone lines or the coaxial cable network provided by the network operator that serve as the conduit through which these additional services, such as home shopping services, are provided, at least some network operators are desirous of charging a fee or a toll based upon the dollar value or the number of transactions between the various service providers and the subscribers. In addition, some network operators are desirous of obtaining this information relating to the number of transactions and the dollar value of the transactions in a manner that is independent of the service providers, such that the network operators need not rely upon the service providers for this information.

SUMMARY OF THE INVENTION

A method and an interactive information services system are therefore provided to permit a network operator to capture transaction data relating to transactions between a subscriber and a service provider that are conducted via a communications network established by the network operator, such as a cable television network. For example, the transaction data can relate to the number of transactions and the dollar value of the transactions. As such, the network operator can charge a fee, a commission or a toll based upon the transaction data, including the number of transactions and/or the dollar amount of the transactions.

According to the present invention, the subscribers are provided with information relating to a plurality of items offered by one or more service providers. While the information relating to the items offered by the service providers can be presented in different manners, the interactive information services system of one embodiment includes a subscriber terminal for presenting a display of the items offered by the service providers. After reviewing the items offered by the service providers, the subscriber can transmit at least one copy of a purchase order for at least one item. While the purchase order can be transmitted in various manners, the interactive information services system of one embodiment includes a selection device for allowing the subscriber to select one or more items offered by the service provider.

The interactive information services system also includes a headend operated by the network operator. The headend receives the purchase order and analyzes a copy of the purchase order to thereby capture transaction data. If the service provider that is offering the item selected by the subscriber is different than the network operator, the headend is adapted to relay a copy of the purchase order to the third party service provider such that the purchase order can be filled by the service provider. Since the network operator has captured information relating to the purchase order at the headend, however, the network operator can charge the service provider and/or the subscriber for utilizing their network to complete the transaction. For example, the network operator can charge a fixed fee per transaction, a percentage of the dollar value of the transaction or any other pricing methodology that is desired and is agreed upon by the parties. As such, the interactive information services system can include means, responsive to the headend, for billing at least one of the service provider and the subscriber for utilizing the communications channel between the network operator and the subscriber based upon the transaction data that was previously captured.

While a copy of the purchase order is forwarded to the service provider in instances in which the service provider is different from the network operator, the purchase order is not forwarded to a third party service provider if the network operator is also the service provider that is offering the items to the subscriber. Instead, the interactive information services system can further include means, responsive to the headend, for filling the purchase order without relaying the purchase order to a third party service provider. As such, the network operator can offer various items to the subscriber and can fill the purchase orders placed by subscribers without involving additional service providers, if so desired.

In one advantageous embodiment, the interactive information services system includes a cable television network that includes the headend and the subscriber terminals. In addition, the cable television network of this embodiment can include a communications link consisting of a forward channel and a reverse channel. The cable television network transmits information from the headend to the subscriber terminals via the forward channel, and transmits the purchase orders from the selection devices to the headend via the reverse channel. The interactive information services system of this embodiment can also include a computer network, such as a wide-area computer network and, more particularly, the Internet, operably connected to the headend. As such, third party service providers, such as Internet-based merchants, can be provided access to the subscribers via the cable television network. Correspondingly, the subscribers of the cable television network can have access to a wide variety of Internet-based merchants and can place purchase orders with any of these Internet-based merchants from the comfort of their homes.

The purchase order can be encrypted prior to being transmitted via the reverse channel of the cable television network. Consequently, the subscribers can transmit confidential information, including credit card information and the like, through the interactive information services system with confidence that the confidential information will remain private. Likewise, the digital signature of a subscriber can be applied to the purchase order prior to being transmitted via the reverse channel to the headend of the cable television network. As such, the network operator and/or the third party service providers can verify the identity of the subscriber placing the purchase order and can thereby avoid repudiation of the order.

A single copy of the purchase order may transmitted from the subscriber to the headend. However, the method and interactive information services system of one advantageous embodiment transmits separate copies of the purchase order to the network operator and the service provider. In this regard, the method and interactive information services system of this embodiment may generate a network operator copy of the purchase order and a service provider copy of the purchase order that are encrypted in different manners. For example, the interactive information services system may include a processing element associated with the subscriber terminal and the selection device for generating the different copies of the purchase order. Following transmission, the headend decrypts and analyzes the network operator copy of the purchase order. However, the service provider copy of the purchase order is relayed along to the service provider without being decrypted, thereby assuring the service provider that the network operator has not altered the purchase order.

BRIEF DESCRIPTION OF THE DRAWINGS

FIGS. 2A and 2B are flow charts illustrating the operations performed by the interactive information services system and associated method of one embodiment to the present invention.

FIG. 3 is a schematic representation of a purchase order transmitted from a subscriber terminal to the headend according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
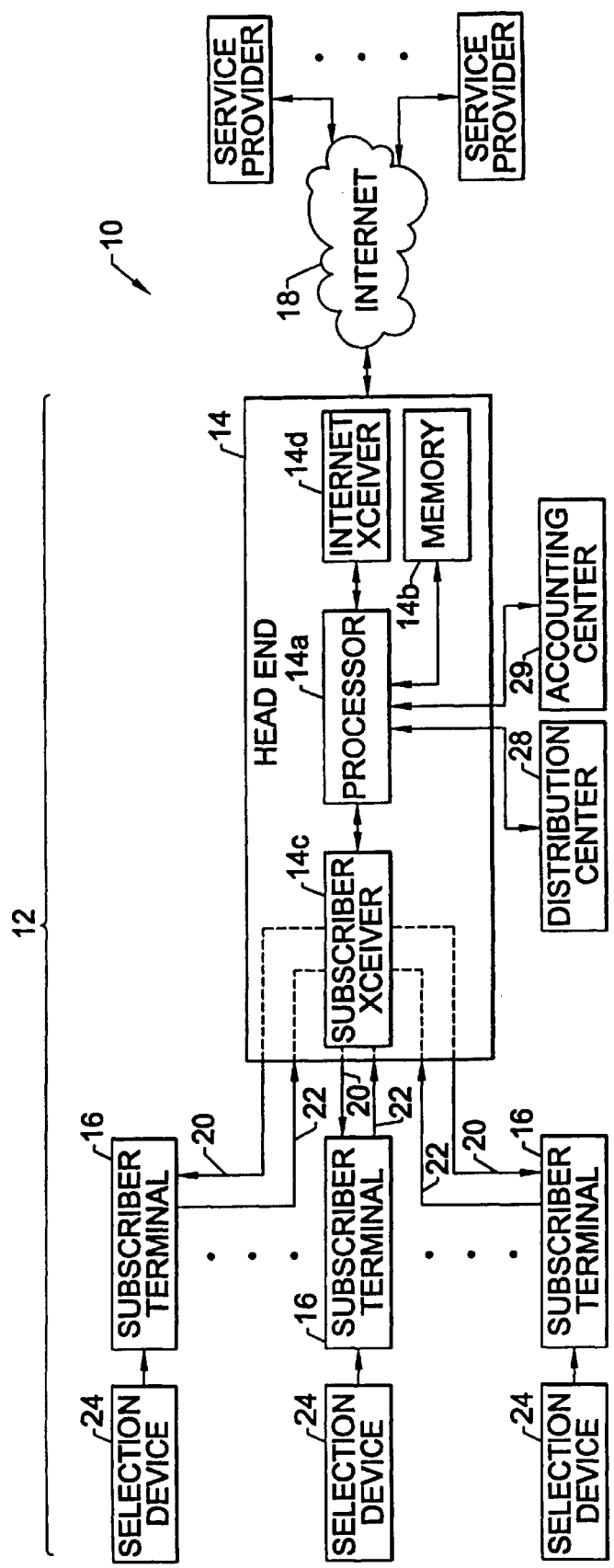
FIG. 1 is a block diagram illustrating an interactive information services system including a headend according to one embodiment to the present invention.

Referring now to FIG. 1, an interactive information services system 10 according to one embodiment to the present invention is depicted. Typically, the interactive information services system includes a cable television network 12 having a headend 14 operated by a network operator and a plurality of subscriber terminals 16, configured to receive cable television programming from the headend. According to the present invention, the interactive information services system can also include a computer network 18, such as a wide-area computer network and, more particularly, the Internet, operably connected to the cable television network and, more particularly, to the headend of the cable television network such that Internet-based content can be provided to the subscribers of the cable television network. As known to those skilled in the art, the Internet is a world wide network of backbone interconnected computer networks, each including uniquely addressable, interconnected computers. However, the interactive information services system of the present invention can include other wide area networks, if so desired.

With respect to the cable television network 12, the headend 14 and the plurality of subscriber terminals 16 are typically connected by means of a forward channel 20 through which information can be transmitted from the headend to the subscriber terminals. In addition, the headend and the plurality of subscriber terminals are also generally connected by means of a reverse channel 22 that permits the subscriber terminals to transmit information to the headend. While the information can be transmitted in a variety of formats and protocols, the subscriber terminals generally transmit information via the reverse channel out of band relative to the forward channel. For example, the signals transmitted via the reverse channel commonly have a frequency of 5 to 45 MHz and are QPSK modulated. As such, the same communications link, such as the same coaxial cable, can be utilized to provide both the forward and reverse channels. Alternatively, the interactive information services system can include separate telephone lines or other means of communications for establishing the forward and reverse channels between the headend and the plurality of subscriber terminals without departing from the spirit and scope of the present invention.

A conventional headend 14 is described in Modern Cable Television Technology; Voice, Video and Data Communications by W. Ciciora, J. Farmer and D. Large; Morgan Kaufmann (1998) and is well known to those skilled in the art. Among other components, a headend includes a processor 14a, associated memory 14b, a subscriber transceiver 14c for communicating with the plurality of subscriber terminals 16 and an Internet transceiver 14d for communicating via the Internet or other computer network with third party service providers. The processor can be configured in many different manners as known to those skilled in the art, but is typically comprised of a combination of hardware, such as one or more controllers or processors, and software.

In addition, the subscriber terminal 16 typically includes a set top terminal and an associated display, such as a television, a computer display or the like. As described in U.S. Pat. No. 5,870,474 to Anthony J. Wasilewski et. al which issued Feb. 9, 1999 and which is incorporated herein by reference in its entirety, a set top terminal typically refers to any subscriber device capable of receiving and decoding digital services, such as personal computers, home control terminals, decoders and the like. By way of example, Scientific Atlanta, Inc. offers a line of advanced set top terminals designated the Explorer Home Communications Terminals including models E2100 and E3100, for example. Among other components, a typical set top terminal generally includes one or more tuners, a processing element, such as a microprocessor or the like, and associated memory. In addition, the processing element of the latest generation of set top terminals includes HTML engines for interfacing with the Internet. The interactive information services system 10 of the present invention also preferably includes a selection device 24 associated with a respective subscriber terminal for providing subscriber input to the headend via the reverse channel 22, as described in more detail below. For example, the selection device can be a handheld remote control, a keyboard, a cellular telephone, a cable modem or the like associated with the subscriber terminal and adapted to communicate via the reverse channel with the headend 14.

Figure 2A:
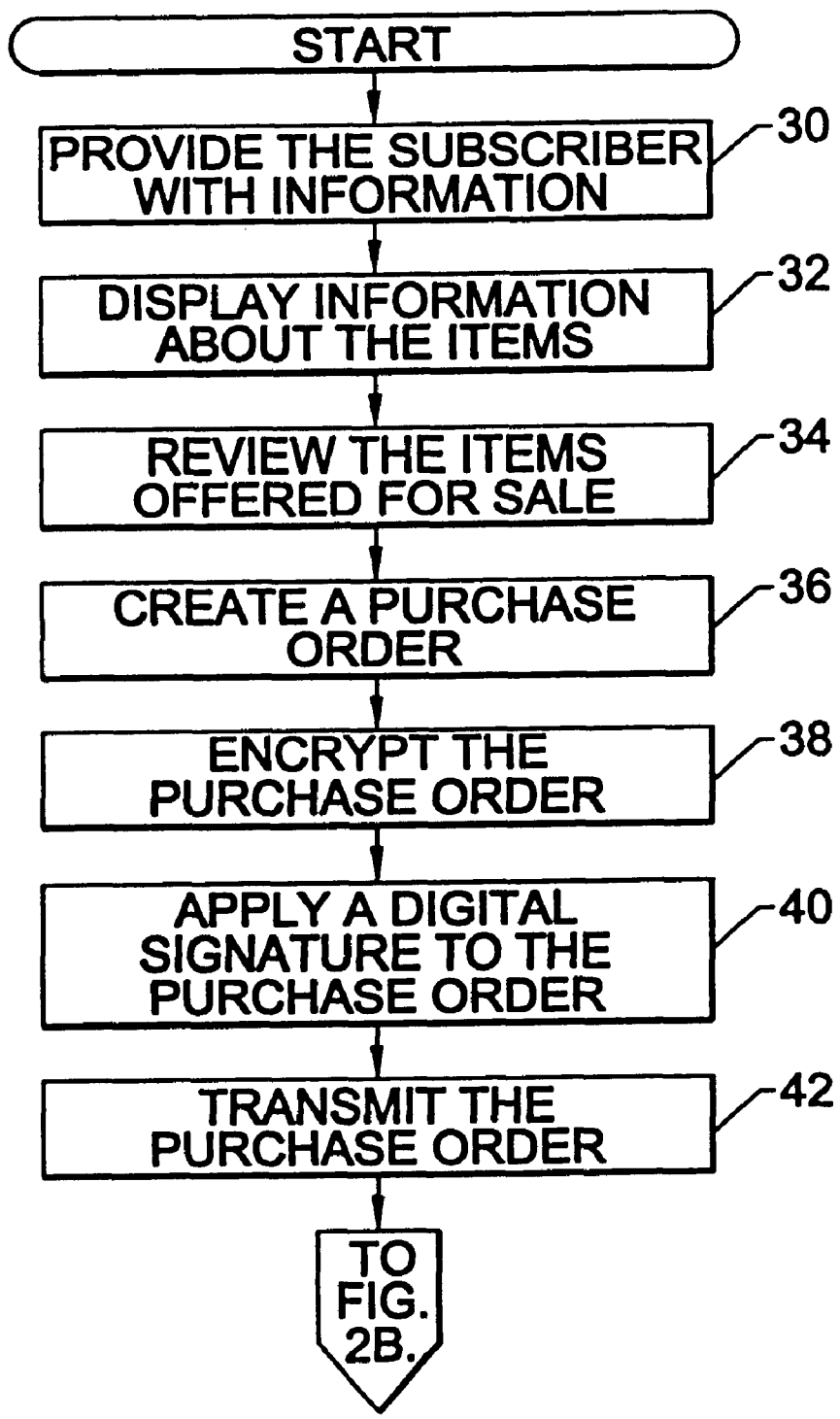

As depicted in the flow charts of FIGS. 2A and 2B which illustrate the operations performed by the interactive information services system 10 and associated method of the present invention, a subscriber is initially provided with information relating to a plurality of items offered by a service provider. See block 30. In the embodiment in which the interactive information services system includes a cable television network 12, the information relating to the items offered by a service provider is transmitted to the subscriber via the forward channel 20 and is received by the set top unit. In the case of video information, the set top terminal drives an associated display to provide images of the items offered by the service provider to the subscriber. See block 32.

The network operator, such as the operator of the cable television network 12, may be the service provider. In this instance, the network operator will essentially be offering various items to their subscribers for purchase, rent or the like. More commonly, the interactive information services system 10 provides a mechanism for third party service providers, i.e., service providers other than the network operator, to offer various items to the subscribers of the cable television network. For example, the third party service providers may be Internet-based merchants who offer a variety of goods and/or services for purchase, rent or the like via the Internet or other computer networks. According to the present invention, however, the computer network, such as the Internet, is communicably connected to the cable television network, typically at the headend 14 of the cable television network, such that the Internet-based merchants can also provide the subscribers of the cable television network with information relating to various items offered for sale, lease or the like. In the embodiment in which the interactive information services system comprises a cable television network that is adapted to communicate with a computer network, such as the Internet, the cable television network and the Internet can be adapted to communicate in a variety of manners. One example is described in Data-Over-Cable Service Interface Specifications (DOCSIS) Radio Frequency Interface Specification, SP-RFIv1.1-I04-000407 (Apr. 7, 2000).

In the typical embodiment, each service provider transmits information, such as video or graphics information, to the subscriber to generate an image illustrating the various items offered by the respective service provider. This information generally includes not only an image or a description of the item, but also the price of the item, the name or other alphanumeric designation of the item and any available options with respect to the item. As such, a virtual shopping mall is created at the subscriber terminal 16 which permits the subscriber to review the items offered by the various service providers. The subscriber terminal and, in particular, the set top terminal can be configured to display the images in various manners. For example, the set top terminal can break the display into frames, each of which is associated with a respective service provider. Alternatively, the set top terminal can place a banner or a ticker across the display such that information relating to the various items offered by the service providers can scroll across the display.

In order to select an item offered for sale, lease or the like by a service provider, the subscriber will generally initially review the items offered by the various service providers. See block 34. Various techniques can be employed for accessing the information provided by the various service providers. For example, a menu of the service providers can be displayed from which the subscriber can select those of interest. Alternatively, the subscriber can enter the name or URL address of a particular service provider in order to access the desired information.

Once the subscriber has identified one or more items that they would like to order, the subscriber indicates their selection by means of the selection device 24. In embodiments in which the selection device is a keyboard, the subscriber can enter the numerical designation of a particular item along with the quantity, any desired options, the delivery address and the method of payment including credit card information or cash on delivery (COD), for example, in order to create a purchase order for the selected item. See block 36. Alternatively, the subscriber can utilize a mouse or other types of selection devices without departing from the spirit and scope of the present invention. Irrespective of the manner in which the items are selected, one example of a purchase order and the information contained therein is depicted in FIG. 3. As shown, the purchase order generally includes information input by the subscriber as described above, as well as additional information appended by the subscriber terminal, such as the set top terminal, to the purchase order, such as the subscriber identification and the service provider identification. The subscriber then transmits the purchase order to the headend 14 in order to place the order. See block 42. As described above, the set top terminal typically transmits the purchase order to the headend via the reverse channel 22, but the purchase order may be transmitted to the headend via other communications paths, such as telephone lines or the like, if so desired.

The set top terminal may transmit the purchase order without any encryption. However, the purchase order is typically encrypted prior to transmission to the headend 14 in order to protect the confidentiality of the information, including credit card information associated with the subscriber. See block 38. Although the purchase order can be encrypted in a variety of manners, the set top terminal generally encrypts the purchase order by a public key encryption technique, such as described by U.S. Pat. No. 5,870,474 to Anthony J. Wasilewski et. al, the contents of which have incorporated herein by reference. Thus, the interactive information services system 10 and, more typically, the set top terminal of the subscriber terminal 16 preferably includes means, such as the processing element, for encrypting the purchase order as described by U.S. Pat. No. 5,870,474.

In one advantageous embodiment, the set top terminal generates two copies of the purchase order, namely, a network operator copy of the purchase order and a service provider copy of the purchase order. Each of these copies may be identical. Alternatively, in embodiments in which the service provider is a different entity than the network operator, the network operator copy of the purchase order may include only a subset of the information embodied by the service provider copy of the purchase order. In this regard, the network operator copy of the purchase order need only include those items of interest to the network operator as described in more detail below. Regardless of the content of each copy of the purchase order, the set top terminal of this embodiment preferably encodes each copy of the purchase order in a different manner. For example, the set top terminal may encode the network operator copy of the purchase order with the public key of the headend and the service provider copy of the purchase order with the public key of the service provider. As such, only the headend will be able to access the network operator copy of the purchase order, while only the service provider will be able to access the service provider copy of the purchase order.

If the purchase order contains a substantial amount of data, the purchase order may not be readily encrypted with a public key. As such, the set top terminal and, in particular, the processing element of the set top terminal may generate a symmetric key and may thereafter perform a bulk encryption of the purchase order with the symmetric key. The product of the bulk encryption may then be encrypted as described above with the public keys of the network operator and the service provider to provide two copies of the purchase order for transmission to the network operator and the service provider, respectively.

Regardless of whether the purchase order is encrypted, the interactive information services system and, more typically, the set top terminal of the subscriber terminal preferably further includes means, such as the processing element, for applying a digital signature to the purchase order to facilitate validation of the order upon receipt at the headend 14. See block 40. Although the digital signature of the subscriber can be applied to the purchase order in a variety of manners, U.S. Pat. No. 5,870,474 to Anthony J. Wasilewski et. al also describes one advantageous technique for applying a digital signature to data transmitted via the reverse channel of a cable television network 18.

Upon receipt by the subscriber transceiver 14c, the headend 14 and, more particularly, the processor 14a analyzes a copy of the purchase order to capture transaction data included within the purchase order. See blocks 44 and 50. With respect to a purchase order that has been encrypted and to which a digital signature has been applied, the headend and, more particularly, the processor of the headend initially decrypts the network operator copy of the purchase order. See block 46. For a network operator copy of the purchase order that has been encrypted with the public key of the headend, for example, the headend can decrypt the purchase order with its private key. If the purchase order has also been encrypted with a symmetric key, the headend would also decrypt the product of the bulk encryption with an appropriate key. In addition, the headend and, more particularly, the headend processor can analyze the digital signature applied to the purchase order to verify or validate that the purchase order originated with the respective subscriber. See block 48. Although the various techniques can be utilized to analyze the digital signature of the subscriber, one advantageous technique utilizing a one-way hash function and a public key encryption technique is described by U.S. Pat. No. 5,870,474 to Anthony J. Wasilewski et. al. After verifying that the digital signature corresponds to the respective subscriber, the headend typically continues to analyze the purchase order since the risk that the purchase order will later be repudiated by the subscriber is significantly reduced.

In analyzing the purchase order, the headend 14 initially determines if the service provider is the network operator itself or a third party service provider. See block 52. In this regard, the purchase order generally includes a field that identifies the respective service provider. See FIG. 3. If the network operator is the service provider, the headend routes the purchase order to an affiliated distribution center 28 as well as an affiliated accounting center 29. The distribution center includes means for filling the purchase order, while the accounting center includes means for billing the subscriber or otherwise arranging for the network operator to be paid for the items ordered by the subscriber. See blocks 54 and 56. In this regard, the subscriber is generally required to provide credit card information with the purchase order such that the cost of the items ordered by the subscriber can be charged to the subscriber's credit card account. Alternatively, in instances in which the interactive information services system 10 includes a cable television network 18, the subscribers already have an account with the network operator of the cable television network. As such, the cost of the items ordered by the subscriber may merely be charged to the subscriber's account which is typically billed to a subscriber on a monthly or quarterly basis. However, it should be understood that the interactive information services system can employ other techniques to arrange payment of the network operator for the items ordered by the subscriber if so desired.

In many instances, however, the purchase order will not indicate that the network operator is the service provider, but will, instead, indicate that the items are being ordered from a third party service provider, such as an Internet-based merchant. In these instances, the headend 14 still extracts transaction data from the network operator copy of the purchase order. See block 50. While a variety of transaction data can be extracted from the network operator copy of the purchase order, the headend typically extracts transaction data which identifies the third party service provider, the dollar value of the order placed by the subscriber as well as any other information that the network operator would like to monitor.

The service provider copy of the purchase order is then relayed to the service provider via the Internet. See block 62. In the embodiment in which the set top terminal provides a network operator copy of the purchase order and a service provider copy of the purchase order that are differently encoded, the headend will merely allow the service provider copy of the purchase order to pass through to the service provider. Since the service provider copy of the purchase order has been encrypted by the set top terminal, the service provider can be assured that the network operator has not altered the purchase order. Moreover, if the set top terminal applied a digital signature to the service provider copy of the purchase order, the service provider can also verify the identity of the subscriber. However, in those embodiments in which the set top terminal only provides a single signed copy of the purchase order, the headend may encrypt the purchase order, such as with the public key of the service provider prior to placing the purchase order on the Internet for delivery to the third party service provider.

Upon receipt, the third party service provider analyzes the service provider copy of the purchase order in much the same fashion described above in conjunction with the analysis performed at the headend 14. In this regard, the third party service provider decrypts the service provider copy of the purchase order and analyzes the digital signature to verify the identity of the subscriber who placed the purchase order. Thereafter, the third party service provider fills the purchase order by shipping the items ordered to the subscriber, while at the same time arranging for payment from the subscriber, such as by means of charging the purchase to the credit card account identified by the subscriber in the purchase order or by any other payment technique acceptable to the third party service provider.

By extracting transaction data identifying at least the identity of the third party service provider and the dollar amount of the items ordered by the subscriber, the network operator can bill the third party service provider and/or the subscriber a toll, a commission or other charge for utilizing its communications network, such as the cable television network 18, as the communications path over which the items were offered and the purchase order was placed. See block 64. A variety of techniques can be utilized to bill the third party service providers and/or the subscribers for use of the communications network, such as a percentage of the dollar value of the purchase order placed by the subscriber, a flat fee per purchase order placed by the subscriber or any other methodology agreed upon by the network operator, the third party service provider and/or the subscribers.

Accordingly, even though the subscriber may not place purchase orders which select items offered by the network operator, the network operator can still receive compensation for providing the communications network over which third party service providers advertise various goods and services and over which subscribers place purchase orders for various ones of the goods and services. Since network operators will receive compensation for the use of their communications networks, network operators may be more willing to allow third party service providers to provide services, including home shopping services, via their communications network, since any decrease in viewership of the cable television programming attributable to the offering of home shopping services should be more than recouped by the additional revenue generated by tolls or other charges levied upon sales made via the communications network established by the network operator.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for capturing transaction data relating to transactions between a subscriber and a service provider conducted via an interactive information services system, the method comprising:

providing the subscriber with information relating to a plurality of items offered by the service provider;

transmitting at least one copy of a purchase order for at least one item from the subscriber to a headend of a network operator of the interactive information services system;

analyzing a copy of the purchase order at the headend to thereby capture transaction data included therein; and relaying a copy of the purchase order to the service provider if a service provider other than the network operator is offering the at least one item selected by the subscriber.

2. A method according to claim 1 wherein the service provider that is offering the at least one item selected by the subscriber is a different entity than the network operator, and wherein the method further comprises billing at least one of the service provider and the subscriber for utilizing a communications channel between the network operator and the subscriber based upon the transaction data captured during said analyzing step.

3. A method according to claim 1 wherein the network operator is the service provider that is offering the at least one item selected by the subscriber, and wherein the method further comprises filling the purchase order without relaying the purchase order to a third party service provider.

4. A method according to claim 1 wherein the interactive information services system comprises a cable television network including the headend and an Internet, wherein said providing and transmitting steps comprise transmitting information via the cable television network, and wherein said relaying step comprises transmitting information via the Internet.

5. A method according to claim 4 wherein said step of transmitting at least one copy of the purchase order comprises transmitting at least one copy of the purchase order to the headend via a reverse channel of the cable television network.

6. A method according to claim 1 further comprising encrypting each copy of the purchase order prior to said transmitting step.

7. A method according to claim 6 further comprising generating a network operator copy of the purchase order and a service provider copy of the purchase order, wherein encrypting each copy of the purchase order comprises differently encrypting the network operator copy of the purchase order and the service provider copy of the purchase order, wherein analyzing a copy of the purchase order comprises analyzing the network operator copy of the purchase order, and wherein relaying a copy of the purchase order comprises relaying the service provider copy of the purchase order.

8. A method according to claim 7 wherein analyzing a copy of the purchase order comprises decrypting the network operator copy of the purchase order without decrypting the service provider copy of the purchase order.

9. A method according to claim 1 wherein transmitting at least one copy of the purchase order comprises transmitting a single copy of the purchase order to the headend.

10. A method according to claim 1 further comprising applying a digital signature of the subscriber to each copy of the purchase order prior to said transmitting step.

11. A method according to claim 1, further comprising processing the captured transaction data to bill the service provider.

12. A method according to claim 1, further comprising processing the captured transaction data to bill the subscriber.

13. An interactive information services system comprising:
    a subscriber terminal for providing a subscriber with information relating to a plurality of items offered by a service provider;
    a selection device for transmitting at least one copy of a purchase order for at least one item selected by the subscriber; and
    a headend for receiving the purchase order and for analyzing a copy of the purchase order to thereby capture transaction data included therein, said headend also being adapted to relay a copy of the purchase order to the service provider if a service provider other than the network operator is offering the at least one item selected by the subscriber.

14. An interactive information services system according to claim 13 wherein the service provider that is offering the at least one item selected by the subscriber is a different entity than the network operator, and wherein the interactive information services system further comprises means, responsive to said headend, for billing at least one of the service provider and the subscriber for utilizing a communications channel between said headend and said subscriber terminal based upon the transaction data.

15. An interactive information services system according to claim 13 wherein the network operator is the service provider that is offering the at least one item selected by the subscriber, and wherein the interactive information services system further comprises means, responsive to said headend, for filling the purchase order without relaying the purchase order to a third party service provider.

16. An interactive information services system according to claim 13 further comprising a processing element associated with said subscriber terminal and said selection device for encrypting each copy of the purchase order prior to transmitting each copy of the purchase order to the headend.

17. An interactive information services system according to claim 16 wherein said processing element generates a network operator copy of the purchase order and a service provider copy of the purchase order, wherein said processing element differently encrypts the network operator copy of the purchase order and the service provider copy of the purchase order, and wherein said headend analyzes the network operator copy of the purchase order and relays the service provider copy of the purchase order.

18. An interactive information services system according to claim 17 wherein said means for analyzing a copy of the purchase order decrypts the network operator copy of the purchase order without decrypting the service provider copy of the purchase order.

19. An interactive information services system according to claim 13 further comprising a processing element associated with said subscriber terminal and said selection device for applying a digital signature of the subscriber to each copy of the purchase order prior to transmission to the headend.

20. An interactive information services system according to claim 13 further comprising:
    a cable television network that includes said headend and said subscriber terminal; and
    an Internet operably connected to said headend for providing service providers access to the subscribers via said cable television network.

21. An interactive information services system according to claim 20 wherein said cable television network comprises:
    a forward channel for transmitting information from said headend to said subscriber terminal; and
    a reverse channel for transmitting the purchase order from said selection device to said headend.

22. A method for capturing transaction data relating to transactions between a subscriber and a service provider conducted via an interactive information services system, the method comprising:
    receiving at least one copy of a purchase order at a headend of a network operator of the interactive information services system, wherein the purchase order identifies at least one item offered by the service provider and selected by the purchaser;
    analyzing a copy of the purchase order at the headend to thereby capture transaction data included therein; and
    relaying a copy of the purchase order to the service provider if a service provider other than the network operator is offering the at least one item selected by the subscriber.

23. A method according to claim 22 wherein the service provider that is offering the at least one item selected by the subscriber is a different entity than the network operator, and wherein the method further comprises billing at least one of the service provider and the subscriber for utilizing a communications channel between the network operator and the subscriber based upon the transaction data captured during said analyzing step.

24. A method according to claim 22 wherein the network operator is the service provider that is offering the at least one item selected by the subscriber, and wherein the method further comprises filling the purchase order without relaying the purchase order to a third party service provider.

25. A method according to claim 22 wherein the interactive information services system comprises a cable television network including the headend and an Internet, wherein said receiving step comprises receiving information via the cable television network, and wherein said relaying step comprises transmitting information via the Internet.

26. A method according to claim 25 wherein said step of receiving information comprises receiving information that has been encrypted.

27. A method according to claim 26 wherein receiving information that has been encrypted comprises receiving a network operator copy of the purchase order and a service provider copy of the purchase order that are differently encrypted, wherein analyzing a copy of the purchase order comprises analyzing the network operator copy of the purchase order, and wherein relaying a copy of the purchase order comprises relaying the service provider copy of the purchase order.

28. A method according to claim 27 wherein analyzing a copy of the purchase order comprises decrypting the network operator copy of the purchase order without decrypting the service provider copy of the purchase order.

29. A method according to claim 22 wherein receiving at least one copy of the purchase order comprises receiving a single copy of the purchase order at the headend.

30. A method according to claim 22 wherein said step of receiving information comprises receiving information that includes a digital signature of the subscriber placing the purchaser order, and wherein said analyzing step comprises analyzing the digital signature to confirm that the information originated with the subscriber.

31. A headend of a network operator of an interactive information services system comprising:
    means for receiving at least one copy of a purchase order that identifies at least one item offered by a service provider and selected by the purchaser;
    means, responsive to said receiving means, for analyzing a copy of the purchase order to thereby capture transaction data included therein; and
    means, responsive to said analyzing means, for relaying a copy of the purchase order to the service provider if a service provider other than the network operator is offering the at least one item selected by the subscriber.

32. A headend according to claim 31 wherein the service provider that is offering the at least one item selected by the subscriber is a different entity than the network operator, and wherein the headend further comprises means, responsive to said analyzing means, for billing at least one of the service provider and the subscriber for utilizing a communications channel between the headend and the subscriber based upon the transaction data.

33. A headend according to claim 31 wherein the network operator is the service provider that is offering the at least one item selected by the subscriber, and wherein the headend further comprises means, responsive to said analyzing means, for filling the purchase order without relaying the purchase order to a third party service provider.

34. A headend according to claim 31 wherein said means for receiving at least one copy of the purchase order receives a network operator copy of the purchase order and a service provider copy of the purchase order that are differently encrypted, wherein said means for analyzing a copy of the purchase order analyzes the network operator copy of the purchase order, and wherein said means for relaying a copy of the purchase order relays the service provider copy of the purchase order.

35. A headend according to claim 34 wherein said means for analyzing a copy of the purchase order decrypts the network operator copy of the purchase order without decrypting the service provider copy of the purchase order.

36. A headend according to claim 31 wherein said means for receiving at least one copy of the purchase order receives a single copy of the purchase order.

37. A headend according to claim 31 wherein said means for receiving information receives information that includes a digital signature of the subscriber placing the purchaser order, and wherein said means for analyzing a copy of the purchase order analyzes the digital signature to confirm that the information originated with the subscriber.

38. A headend according to claim 31 wherein the headend comprises a portion of a cable television network, and wherein said relaying means comprises means for relaying at least a portion of the purchase order to the service provider via the Internet.

39. A method of providing a service to a subscriber of an interactive information services system, the method comprising the steps of:
    receiving at a headend of the interactive information services system a network operator copy of a purchase order from the subscriber;
    receiving at the headend a service provider copy of the purchase order from the subscriber, wherein the network operator copy of the purchase order and the service provider copy of the purchase order are associated with the same purchase by the subscriber from a service provider;
    analyzing the network operator copy of the purchase order to determine whether the network operator is the service provider or whether a third party is the service provider;
    capturing transaction data included in the network operator copy of the purchase order;
    responsive to determining the third party is the service provider, relaying the service provider copy of the purchase order to the third party; and
    responsive to determining the third party is the service provider, billing at least one of the third party and the subscriber for utilizing the interactive information service system based at least upon the captured transaction data.

40. The method of claim 39, further including the steps of:
    responsive to determining the network operator is the service provider, billing the subscriber for utilizing the interactive information service system based at least upon the captured transaction data; and
    responsive to determining the network operator is the service provider, relaying the service provider copy of the purchase order to a distribution center, wherein the distribution center fills the order for the subscriber.

41. The method of claim 39, further including the steps of:
    maintaining a subscriber database having billing information for subscribers of the interactive information service system included therein, wherein the network operator employs the subscriber database to bill the subscriber for utilizing the interactive information service system.

* * * * *